United States Patent [19]

Harkleroad et al.

[11] 4,199,061
[45] Apr. 22, 1980

[54] RECORD ALBUM AND BOOKLET

[75] Inventors: Whitney C. Harkleroad, Lancaster, Pa.; Mark Heyderman, Miller Place, N.Y.; Louis A. Ringle, Wilmington, Del.

[73] Assignee: Franklin Mint Corporation, Franklin Center, Pa.

[21] Appl. No.: 914,477

[22] Filed: Jun. 12, 1978

[51] Int. Cl.² ............................................ B65D 85/30
[52] U.S. Cl. .................................... 206/232; 206/313
[58] Field of Search ............... 206/232, 309–313, 206/425; 281/31; 402/70, 73–75

[56] References Cited

U.S. PATENT DOCUMENTS

| | | | |
|---|---|---|---|
| 1,683,479 | 9/1928 | Wystrom | 206/311 X |
| 1,912,710 | 6/1933 | Kennedy | 281/31 |
| 2,318,192 | 5/1943 | Boelema, Jr. | 281/31 |
| 2,580,141 | 12/1951 | Vidal | 206/232 |
| 2,691,440 | 10/1954 | Spugios et al. | 206/312 |
| 2,947,552 | 8/1960 | Derenski | 281/31 X |
| 3,367,340 | 2/1968 | David et al. | 402/75 X |
| 3,537,728 | 11/1970 | Reese | 281/31 |
| 3,688,898 | 9/1972 | Stanton | 206/312 |
| 3,758,136 | 9/1973 | Guyer | 281/31 X |
| 3,825,112 | 7/1974 | Schumaker et al. | 206/310 |
| 3,826,360 | 7/1974 | Shore | 206/312 |
| 3,949,872 | 4/1976 | Paudras | 206/310 |

FOREIGN PATENT DOCUMENTS

| | | | |
|---|---|---|---|
| 477568 | 6/1929 | Austria | 206/232 |
| 783277 | 7/1935 | France | 206/312 |
| 1213757 | 4/1960 | France | 281/31 |
| 538048 | 3/1941 | United Kingdom | 206/312 |
| 890131 | 2/1962 | United Kingdom | 281/31 |

*Primary Examiner*—Stephen Marcus
*Attorney, Agent, or Firm*—Seidel, Gonda, Goldhammer & Panitch

[57] ABSTRACT

A record album having a receptacle on the inner surface of each of the front and back covers is provided with printed sheets attached to the spine and disposed between said receptacles. The album is constructed to provide substantial protection for the records therein regardless of whether the album is employed for shipment through the mails or storage of the record.

5 Claims, 4 Drawing Figures

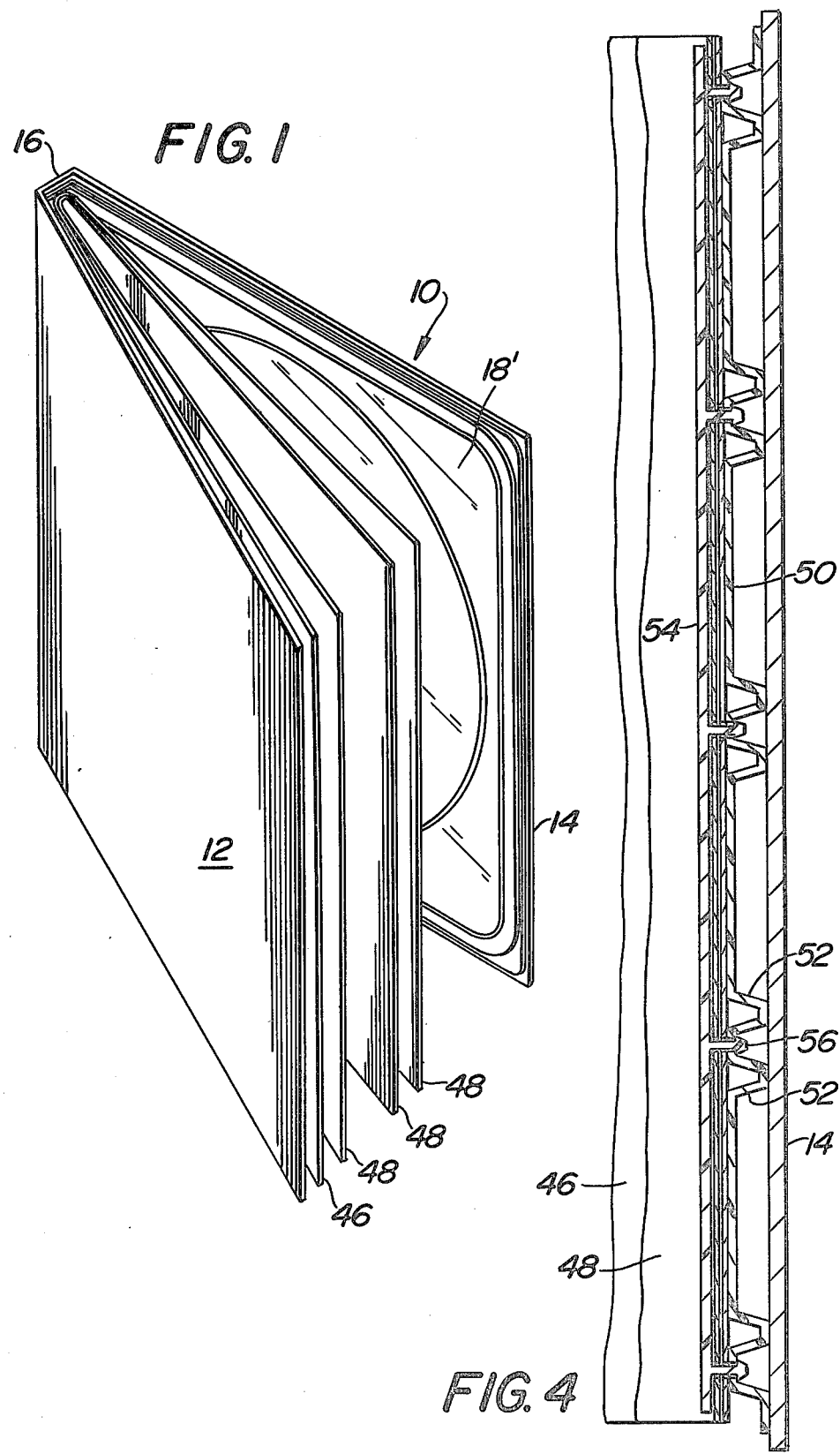

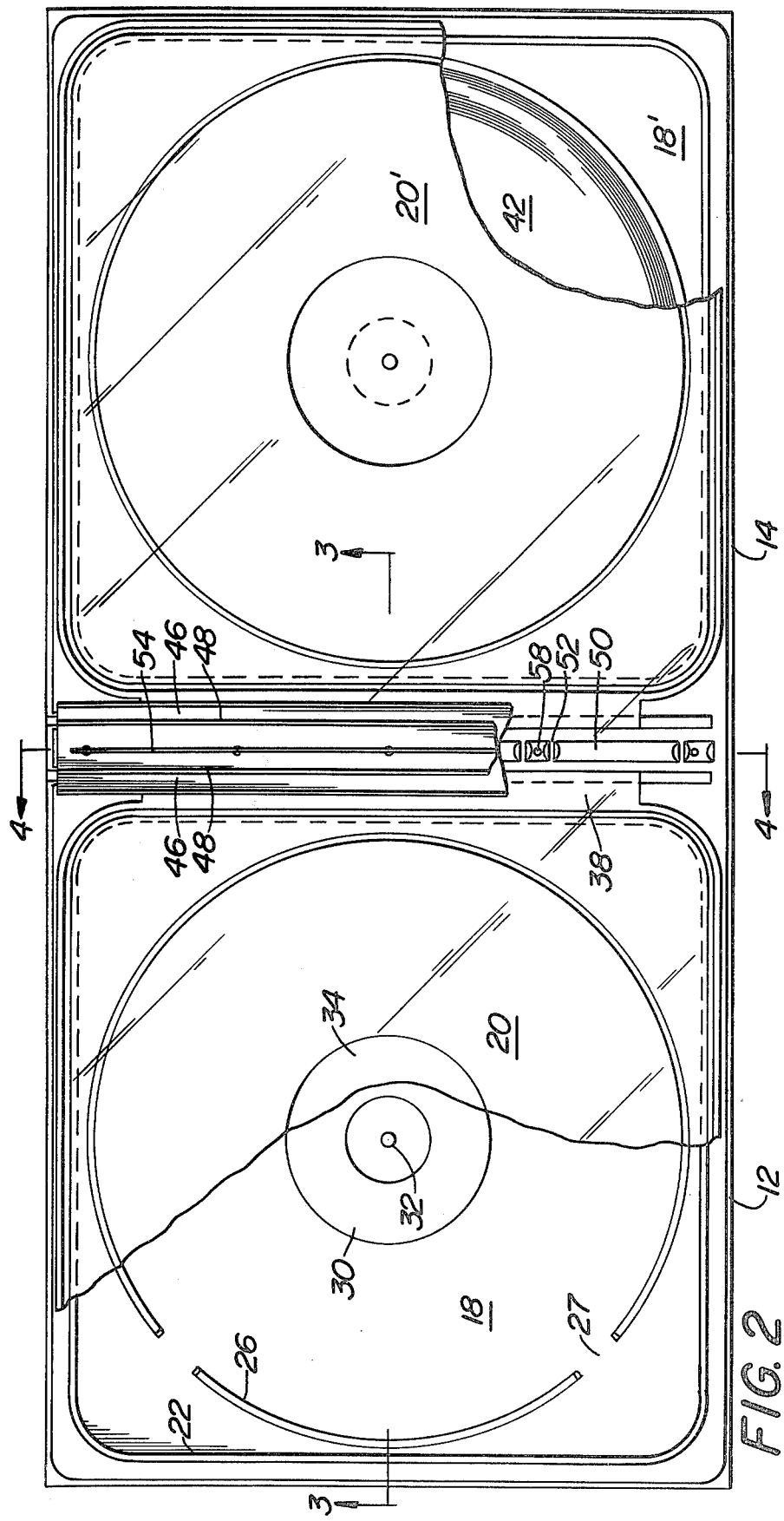
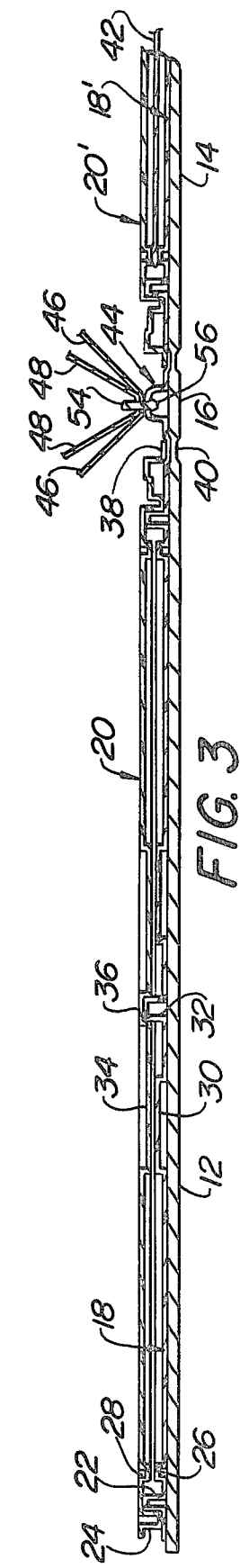

RECORD ALBUM AND BOOKLET

BACKGROUND

Phonograph record albums which include a receptacle defined by a liner body and lid are well known to those skilled in the art. For purposes of background, see U.S. Pat. Nos. 3,688,898; 3,825,112 and 3,949,872. The prior art lacks the concept of providing printed sheets within the album and forming a part of the album. The sheets are printed with information relating to the phonograph records, the composer, etc.

SUMMARY OF THE INVENTION

The present invention is directed to a combined phonograph record album and booklet. The album has a front cover panel and a rear cover panel. The cover panels are connected together by a hinge along one peripheral edge of each panel. A phonographic record receptacle is secured to the inner surface of each cover panel. Sheet material is disposed between said receptacles. A retainer means secures said sheet material to said album adjacent said hinge.

In a preferred embodiment of the invention, the front and cover panels are hinged to a spine. The retainer means includes a retainer member secured to the spine and having spaced holes therealong. A retainer bar is provided with projections. Each projection on the retainer bar passes through the sheet material and is secured in one of the holes on the retainer member.

It is an object of the present invention to provide a record album structurally interrelated in a manner so as to include a booklet comprised of printed sheets secured to the album between a phonograph record receptacle on the inner surface of each cover panel of the album.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a perspective view of a partially opened album in accordance with the present invention.

FIG. 2 is a top plan view of the album in an open disposition.

FIG. 3 is a sectional view taken along the line 3—3 in FIG. 2 but on an enlarged scale.

FIG. 4 is a sectional view taken along the line 4—4 in FIG. 2 but on an enlarged scale.

Referring to the drawings in detail, wherein like numerals indicate like elements, there is shown in FIG. 1 a phonograph record album and booklet in accordance with the present invention designated generally as 10. The album 10 is provided with a front cover panel 12 and a rear cover panel 14. In a preferred embodiment of the invention, the cover panels 12 and 14 are hinged along one peripheral edge to a spine 16.

While the cover panels 12 and 14 may be made from a wide variety of materials, the preferred embodiment is to use 0.120 bindersboard with grain parallel to the spine. The preferred material for the spine is the same as that for the cover panels. Further, a wrap material is preferably provided on the outer faces of the cover panels and spine of a material capable of being decorated by silk screen, print or hot stamp. A wide variety of commercially available cover wrap material is known to those skilled in the art.

Referring to FIGS. 2 and 3, on the inner surface of each of the cover panels 12 and 14, there is provided a receptacle for a phonograph record. In this regard, a liner 18 is vacuum formed from a polymeric plastic material such as 0.20 rigid vinyl. A liner 18' which is identical to liner 18 and integral in one piece therewith overlies the inner surface of cover panel 14. The liners 18, 18' are heat sealed or adhesively bonded to the inner surface of the cover panels 12 and 14, respectively. Liner 18 is provided with a hinged lid 20 and liner 18' is provided with a hinged lid 20'. Since the receptacles are identical, only the receptacle defined by liner 18 and lid 20 will be described in detail.

Referring to FIGS. 2 and 3, the liner 18 is provided with an upstanding peripheral boss 22 which is rectangular in plan view. Lid 24 is provided with a downwardly directed peripheral boss 24 of a size slightly larger than that and of matching configuration to the boss 22. Radially inwardly from the boss 22, a liner 18 is provided with an upstanding generally circular boss 26. Boss 26 is provided with interruptions 27 at spaced points for purposes to be made clear hereinafter. Radially inwardly of the boss 26, there is provided a boss 30 surrounding an upstanding pin 32. The bosses are provided in the liner 18 by vaccum forming the same in a manner so that a sealed joint is attained between bosses 22 and 24. Bosses 30 and 26 are dimensioned so as to support a phonograph record 42 radially inwardly from and radially outwardly from the grooves thereon. The locations 27 facilitate placing a fingernail beneath the record 42 to facilitate removing the same.

The cover 20 is likewise formed with a downwardly directed circular boss 28 coaxial with and aligned with the boss 26. Lid 20 has a depression 34 coextensive with boss 30 and extending radially inwardly to the cavity 36 which receives the pin 32. Pin 32 extends through a hole in the phonograph record 42. Boss 26 is spaced from boss 28 by a distance corresponding to the thickness of the phonograph record 42. Likewise, boss 30 is spaced from depression 34 by a distance corresponding to the thickness of the phonograph record 42.

The cover panel 12 is joined to the spine 16 by hinge 40. Lid 20 has a flange 38, shorter than the length of the spine 16, which is fixedly secured to the hinge 40 in any convenient manner such as by heat sealing, adhesive or the like. As shown more clearly at the lefthand end of FIG. 3, the lid 20 has a peripheral flange to facilitate lifting the lid 20 upwardly as it is pivoted about the hinge 40. The liner 18 and its associated cover 20 may be made of transparent, translucent, or opaque material.

Liner 18 is connected to the liner 18' and is integral in one piece therewith by way of a retainer 44. The retainer 44 overlies the spine 16. As shown more clearly in FIG. 4, two sheets 46, 48 are folded on themselves and secured to the spine 16 by the retainer 44. The retainer 44 includes the semicircular retainer member 50 and a retainer bar 54. The retainer member 50 is provided with spacers 52 in sets of two at spaced points therealong. The spacers 52 interrupt the member 50 and appear as gaps in plan view. See FIGS. 2 and 4.

The member 50 is provided with a hole at the crest thereof in that portion between adjacent spacers 52. Each hole is designated 58. The retainer bar 54 is provided with a projection 56 at right angles thereto. The spacing between adjacent projections 56 corresponds to the spacing between adjacent holes 58. Each projection 56 extends through a hole at the crease of the sheets 46, 48 and extends through a hole 58 in member 50. Each projection 56 preferably has a barb so as to retain the bar 54 assembled to the member 50. The bar 54 has a length corresponding generally to the length of member 50 and each has a length slightly less than the length of the spine 16. The sheets 46 and 48 are preprinted with literature related to the history of the recording on record 42, the history of the composer, etc. The combined thickness of each cover panel and its record receptacle corresponds generally to the width of the spine 16.

It will be noted that a minimum number of components are utilized in the album and booklet of the present invention. Thus, the cover panels 12 and 14 are connected together in one piece with the spine 16 by way of the hinges 40. The liners 18 and 18' are integral in one piece with the retainer member 58. Thus, the album and booklet of the present invention minimize costs while facilitating ease of manufacture and assembly without detracting from the attractiveness of the album and booklet.

The present invention may be embodied in other specific forms without departing from the spirit or essential attributes thereof and, accordingly, reference should be made to the appended claims, rather than to the foregoing specification as indicating the scope of the invention.

We claim:

1. An article of manufacture comprising a record album having a stiff front cover panel and a stiff rear cover panel, hinge means pivotably connecting said panels together along a juxtaposed peripheral edge of the panels, a discrete record receptacle secured to the inner face of each cover panel, each receptacle being made from a plastic material and being comprised of a liner and a cover, the liner on each cover panel being integral in one piece with the liner on the other cover panel, each cover and the associated portion of the liner on its cover panel being approximately the same size, each cover having a flange along one side edge and pivotably connected to said liner adjacent said hinge means, each cover having a boss cooperating with a mating boss on its associated portion of the liner so that the bosses may contact a side face of a record adjacent the outer periphery of a record therebetween, each cover having a rim portion projecting outwardly beyond its associated boss, the rim portion on each cover having means for cooperating with mating structure on the associated portion of its liner for securing the cover in a closed position.

2. An article of manufacture in accordance with claim 1 wherein the boss on each portion of the liner is discontinuous.

3. An article of manufacture in accordance with claim 1 including an elongated retainer attached to the inner periphery of the hinge means, an elongated retainer member overlying the retainer and releasably attached thereto, at least one sheet of material disposed between said panels with a central portion of the sheet material disposed between said retainer and retainer member.

4. A record album and booklet comprising a front cover panel, a back cover panel, a spine hinged to each of said cover panels, each cover panel having a major inner face and a major outer face, a phonograph record receptacle secured to each major inner face of said panels, each receptacle being comprised of a liner and a cover pivoted thereto, each liner having an integral circular boss for contacting the outer peripheral portion of a phonograph record, an elongated retainer member secured to said spine on an inner face thereof, said retainer member being hollow and having a semi-cylindrical portion, sheet material between said receptacles, a retainer bar securing said sheet material to said retainer member, said sheet material having a portion disposed between said retainer bar and said retainer member, said retainer bar being provided with a plurality of projections, said retainer member having a plurality of holes, each projection extending through a hole in the sheet material and into one of said holes in the retainer member, said retainer member having spacers at spaced points there along, each spacer extending to said spine, the holes in the retainer member being between adjacent spacers.

5. A combined record album and booklet comprising a front cover panel and a back cover panel, spine means pivotally connecting juxtaposed edges of said panels, said panels having a major outer face and a major inner face, means for removably retaining a phonograph record on the major inner face of each of said panels, paper sheet material having holes in a central portion thereof, means removably securing said sheet material to said spine means in a disposition between said inner faces, said last mentioned means including an elongated retainer member secured integral with said spine means and extending lengthwise thereof, an elongated retainer bar overlying the central portion of said sheet material, said retainer bar having a plurality of projections at spaced locations therealong corresponding to the spacing between adjacent holes in said sheet material, each projection extending through one of the holes in the sheet material and being connected to said retainer member.

* * * * *